United States Patent [19]

Adolph et al.

[11] Patent Number: 5,132,540
[45] Date of Patent: Jul. 21, 1992

[54] DEAD TIME CORRECTION AND REGULATION METHOD AND APPARATUS FOR NUCLEAR SPECTROSCOPY

[75] Inventors: Robert A. Adolph, Houston; Bradley A. Roscoe, Pasadena, both of Tex.

[73] Assignee: Schlumberger Technology Corporation, Houston, Tex.

[21] Appl. No.: 711,599

[22] Filed: Jun. 6, 1991

Related U.S. Application Data

[63] Continuation of Ser. No. 373,112, Jun. 28, 1989, abandoned.

[51] Int. Cl.$^5$ .................... G01T 1/208; G01V 5/00
[52] U.S. Cl. .................... 250/369; 250/262
[58] Field of Search ........... 250/389, 395, 261, 262, 250/270, 369, 363.03, 370.01, 374, 375, 388, 389, 395, 387

[56] References Cited

U.S. PATENT DOCUMENTS

| | | | |
|---|---|---|---|
| 3,576,995 | 5/1971 | Nirschl et al. | 250/388 |
| 3,745,346 | 7/1973 | Culver | 250/261 |
| 4,292,539 | 9/1981 | Todd | 250/374 |
| 4,369,495 | 1/1983 | Inbar et al. | 364/414 |
| 4,419,579 | 12/1983 | East | 250/374 |
| 4,423,329 | 12/1983 | De Burgos Garcia et al. | 250/374 |
| 4,476,384 | 10/1984 | Westphal | 250/252.1 |
| 4,491,733 | 1/1985 | Wasserman | 250/374 |
| 4,593,198 | 6/1986 | Pang et al. | 250/366 |
| 4,612,443 | 9/1986 | Alcidi | 250/362 |
| 4,617,680 | 10/1986 | Johnston | 377/10 |
| 4,618,775 | 10/1986 | Persyk et al. | 250/369 |
| 4,620,421 | 11/1986 | Brown et al. | 62/3 |
| 4,634,863 | 1/1987 | Schwartz | 250/262 |
| 4,772,793 | 9/1988 | Larson et al. | 250/374 |
| 4,788,424 | 11/1988 | Preeg | 250/270 |

OTHER PUBLICATIONS

"Radiation Detection and Measurement", by: Glenn F. Knoll (1988), pp. 615-525, 659-683, 720-730.

Primary Examiner—Constantine Hannaher
Assistant Examiner—Edward J. Glick
Attorney, Agent, or Firm—Henry N. Garrana; John H. Bouchard

[57] ABSTRACT

A nuclear spectroscopy method and apparatus for the analysis of a signal comprising pulses representative of random nuclear events, and for the determination of the dead time, including counting and recording, versus time, the accumulated counts of the pile-up events (PU), i.e. events identified as being characteristic of two or more overlapping events, and the counts of non pile-up events (NPU), for each of successive time intervals of a measurement cycle. Particularly the method includes: forming a preliminary reference plot of the PU count rates versus the NPU count rates; forming an actual plot corresponding to the signal under analysis, of PU count rates versus NPU count rates; and deducing the dead time from comparison between actual and reference plots. In an alternative embodiment, the method allows one to maintain constant the dead time, during the signal analysis, by: establishing a preliminary relationship between dead time and different plots of PU count rates versus NPU count rates; establishing a preliminary relationship between the plots and a functioning parameter; establishing a reference plot corresponding to an imposed dead time; establishing an actual plot; comparing the actual and reference plots; and modifying the functioning parameter so as to bring the respective actual and reference plots in compliance.

21 Claims, 6 Drawing Sheets

DEAD TIME CORRECTION AND REGULATION METHOD AND APPARATUS FOR NUCLEAR SPECTROSCOPY

This is a continuation of application Ser. No. 07/373,112 filed Jun. 28, 1989, now abandoned.

BACKGROUND OF THE INVENTION

1. Field of the invention

This invention relates generally to the analysis and process of random pulse signals, issued from a radiation detector, such as a scintillation detector/photomultiplier.

2. The prior art

In a wide variety of communication, telemetering and data processing systems, information from a signal source is transmitted in the form of pulses to detection apparatus which records, counts the number of, or otherwise processes, the transmitted pulses. By way of example, the well logging techniques use such systems. Of the many well logging techniques developed over the years to determine characteristics of the earth formations, such as the hydrocarbon content and productivity, the nuclear spectroscopy tool, by which energy spectra of the constituents of formation matrices and fluids are generated, has been found to provide information of particular value in earth formation analysis. Typically, the energy spectra are obtained by detecting the gamma rays resulting, either from the natural radioactivity, or from interactions of said formations nuclei with high energy neutrons irradiating said formation, and by converting each detected gamma ray into an electrical pulse whose amplitude is a measure of the gamma ray energy. These pulses are then sorted according &.o height in a pulse height analyzer to develop energy spectra characteristic of the earth constituents near the tool.

Generally, the detection of a series of distinct pulses, at low count rate, offers very few problems, and conventional detection equipment may be employed. Often, however, the frequency, or repetition rate, of the pulses varies over a wide range such that the spacing between successive pulses are sometimes very short. Thus, the random character and high rates of occurrence of these signals necessarily produce a "pile-up", or a sequence of overlapping pulses at the amplifier unit. Usually, a pile-up of this sort results in a single pulse that is composed of two or more amplified individual detected signals, each of which is indicative of a detected gamma ray, neutron or other nuclear radiation. The pile-up phenomenon results in data losses and/or spectrum distortion. Accordingly, it is of importance, first to distinguish individual pulses from pile-up pulses, and second, when pile-up pulses have been detected, to adequately process these in order to restore the original distinct pulses, or at least to bring adequate correction to the actual detected signal.

Typical nuclear spectrum analyzers, such as described in the book "*Radiation Detection and Measurement*" by Glenn F. Knoll (1979), includes, successively, a scintillation detector, a photomultiplier, a coupler (usually a capacitor), a preamplifier, a pulse shaping unit, and a pulse height analyzer; known pulse height analyzers comprise successively a pulse detector (optionally a pile-up detector, and a pile-up process unit), an analog-to-digital converter (ADC) and a memory, the different channels of which correspond to a given amplitude level of the detected pulse; the pulse height analyzer may also comprise, upstream of the ADC, an input gate preventing pulses from reaching the ADC when the latter is busy, i.e. when the ADC is processing a detected pulse. In addition, spectrum analyzers usually comprise a multichannel count device, which determines the time spectra with respect to a reference time, by recording the accumulated counts in each of the time intervals (of e.g. 1 microsecond) of a given measurement time cycle, of e.g. 90 microsecond; such count is usually repeated over several measurement time cycles.

The minimum time interval separating two successive events, which is needed for identifying said events as distinct events, is set by the detector itself, as well as by the different electronic components of the nuclear spectroscopy apparatus. This minimum time interval is usually called "dead time".

A correction method for the losses resulting from the dead time has already been proposed, and which is described in the book by Knoll already referred to, especially pages 95–102. Briefly stated, the correction is based on a mathematical relationship between the true or real count rate "n", the recorded count rate "m", and the dead time "T". One of two mathematical relationships is used depending upon the theoretical model of dead time behavior chosen to represent the actual dead time behavior of the nuclear spectroscopy apparatus in use. Usually, dead time is not accurately known and is determined by empirical measurements, either by observing the counting rate from two sources, individually and in combination, or by using a short-lived radioisotope source, as set forth in the book by Knoll.

These known determination methods can be complex to implement, require specialized and costly equipment, and thus can only be carried out in a laboratory. In addition, most of these methods require stopping the data acquisition pending, to perform the dead time measurement.

Moreover, and above all, the dead time is determined, according to these known methods, under laboratory condition, for each given apparatus, while the dead time actually varies with operating conditions, such as temperature, and also varies from one apparatus to another. By way of example, dead time may vary as much as 50% with temperature, and to an extent of 10% from one apparatus to the other. Some attempts have been made to limit the temperature effects by providing a temperature stabilization device, such as the one described in U.S. Pat. No. 4,620,421 issued to W. K. Brown; this device, nevertheless, increases the complexity of the whole spectroscopy apparatus, without totally obviating temperature effects.

Accordingly, a reliable dead time determination is required, all the more since dead time changes have a substantial effect, not only on the count rates, but also on the measured energy spectrum. However, none of the aforementioned known determination and/or correction methods of the dead time are satisfactory, especially for logging techniques.

SUMMARY OF THE INVENTION

A first object of the invention is to provide a nuclear spectroscopy method and apparatus allowing quick, simple, and reliable determination of the dead time in real time, and also bringing an appropriate correction to the time spectra (i.e. accumulated counts versus time).

A second object of the invention is to provide a nuclear spectroscopy method and apparatus allowing regulation of the dead time, for maintaining, during signal analysis, the dead time to an imposed constant value.

In accordance with a first object of the invention, a nuclear spectroscopy method for the analysis of an electrical signal emitted by a radiation detector and including random nuclear events, represented by pulses, whose amplitude is a measure representative of the nuclear radiation, such as gamma rays, collected by the radiation detector, said method including the step of determining the minimum time interval, or dead time, which must separate two successive events so that the successive events can be recorded as distinct events, wherein the method includes the step of counting and recording, versus time, the accumulated counts of the pile-up events, i.e. events identified as being characteristic of two or more overlapping events, and the counts of non pile-up events, for each of successive time windows of a measurement cycle, said step being repeated over several measurement cycles. This allows one to correct for the variations of the count rate during said cycle.

According to another feature of the invention, the method includes the step of establishing the relationship between pile-up event count rates and non pile-up event count rates, for different predetermined values of the dead time.

More specifically, the relationship is a plot of the pile-up event count rates, versus the non pile-up event count rates, for different predetermined values of dead time.

According to a preferred embodiment, the method includes:

prior to the signal analysis, counting and recording, for different predetermined values of dead time, the pile-up count rates versus the non pile-up count rates, so as to form a reference plot;

counting and recording the pile-up count rates of the signal to be analyzed, versus the non pile-up count rates, so as to form an actual plot; and comparing said actual plot to said reference plot and thus determining the actual dead time value.

It is meant by "amplitude being a measure representative of the nuclear radiation", that a characteristic of the electrical pulse signal is measured, such as e.g. the peak amplitude, or the integral, or one or several sample values; such characteristic is used for calculating e.g. the energy of such pulse. Furthermore, "pile-up count rates" and "non pile-up count rates" mean here count rates corresponding to respectively pile-up events and non pile-up events.

For making said reference plot, prior to the signal analysis, the dead time is first modified through modification of a functioning parameter of the signal analysis process, and then determined, through e.g. known methods.

Advantageously, said cycle is substantially longer than the duration of the events, and, by way of example, includes between ten and one hundred or a few hundreds of said time windows. Time windows are e.g. of one microsecond.

The method of the invention, apart from a dead time determination step, further includes a step of correction of the time spectrum, by calculating the corrected total count rate, as a function of the measured count rates and dead time, according to a predetermined mathematical formula, giving e.g. the corrected count rates as the sum of the actual non pile-up count rates, plus the product of the actual pile-up count rates by a correcting factor which is a function of the dead time, of the non pile-up count rates and/or of pile-up count rates.

According to a second object of the invention, the method includes a dead time regulating step.

In a preferred embodiment, the dead time regulating step includes:

establishing, prior to signal analysis, the relationship between dead time and different plots of pile-up count rates versus non pile-up count rates;

establishing, prior to the signal analysis, the relationship between said plots and a functioning parameter characteristic of the signal analysis process;

establishing a reference plot corresponding to an imposed constant dead time value;

establishing the actual plot of pile-up count rates versus non pile-up count rates;

comparing the actual plot and the reference plot;

modifying, in case of a difference between the respective actual and reference plots, the functioning parameter so as to bring the actual plot in accordance with the reference plot.

In connection with the first object of the invention, it is proposed a nuclear spectroscopy apparatus for the analysis of an electric signal emitted by a radiation detector and including random nuclear events, represented by pulses, whose amplitude is a measure representative of the nuclear radiation, such as gamma rays, collected by said radiation detector, said apparatus including means for determination of the minimum time interval, or dead time, which must separate two successive events, so that said events can be recorded as distinct events, wherein said apparatus includes means for, prior to the signal analysis, counting and recording, versus time, the accumulated counts of the pile-up events, i.e. corresponding to events identified as being characteristic of two or more overlapping events, and the counts of the pile-up events, for each of successive time intervals of a measurement time cycle. Preferably, said means for counting and recording are able to perform over several measurement time cycles.

More specifically, the apparatus comprises: first means for, prior to the signal analysis, counting and recording, for different predetermined values of dead time, the pile-up count rates, versus the non pile-up count rates, so as to form a reference plot;

second means for counting and recording the pile-up count rates of the signal to be analyzed versus the non pile-up count rates, so as to form an actual plot; and means for comparing said actual plot to said reference plot, and thus determining the actual dead time value.

The first counting and recording means includes, preferably, means for modifying the dead time to different values, by modifying a functioning parameter of the signal analysis apparatus.

Also, according to the second object of the invention, the apparatus includes dead time regulation means, for maintaining, during signal analysis, said dead time to an imposed cons&:ant value.

In a preferred embodiment, the dead time regulation means include:

means for establishing, prior to signal analysis, the relationship between dead time and different plots of pile-up count rates versus non pile-up count rates;

means for establishing, prior to the signal analysis, the relationship between said plots and a functioning parameter of the signal analysis process;

means for establishing, prior to the signal analysis, a reference plot corresponding to an imposed constant dead time value;

means for establishing the actual plot of pile-up count rates versus non pile-up count rates, representative of the signal under analysis;

means for comparing said actual plot and said reference plot; and means for modifying, in case of a difference between said respective actual and reference plots, the functioning parameter so as to bring said actual plot in accordance with said reference plot.

Preferably, wherein said apparatus includes pulse shaping means, the modification means are designed to operate on a time constant characteristic of said pulse shaping means.

The characteristics and advantages of the invention will appear better from the description to follow, given by way of a non limiting example, with reference to the appended drawings in which:

DETAILED DESCRIPTION

As mentioned, the present invention affords improved method and apparatus for nuclear spectroscopy, which by way of example, has particular utility in well logging applications, and a representative embodiment of the invention is described and illustrated herein in that environment. It will be understood, however, that this is merely illustrative of but one of the various applications for which the invention is suitable.

Figure 1:
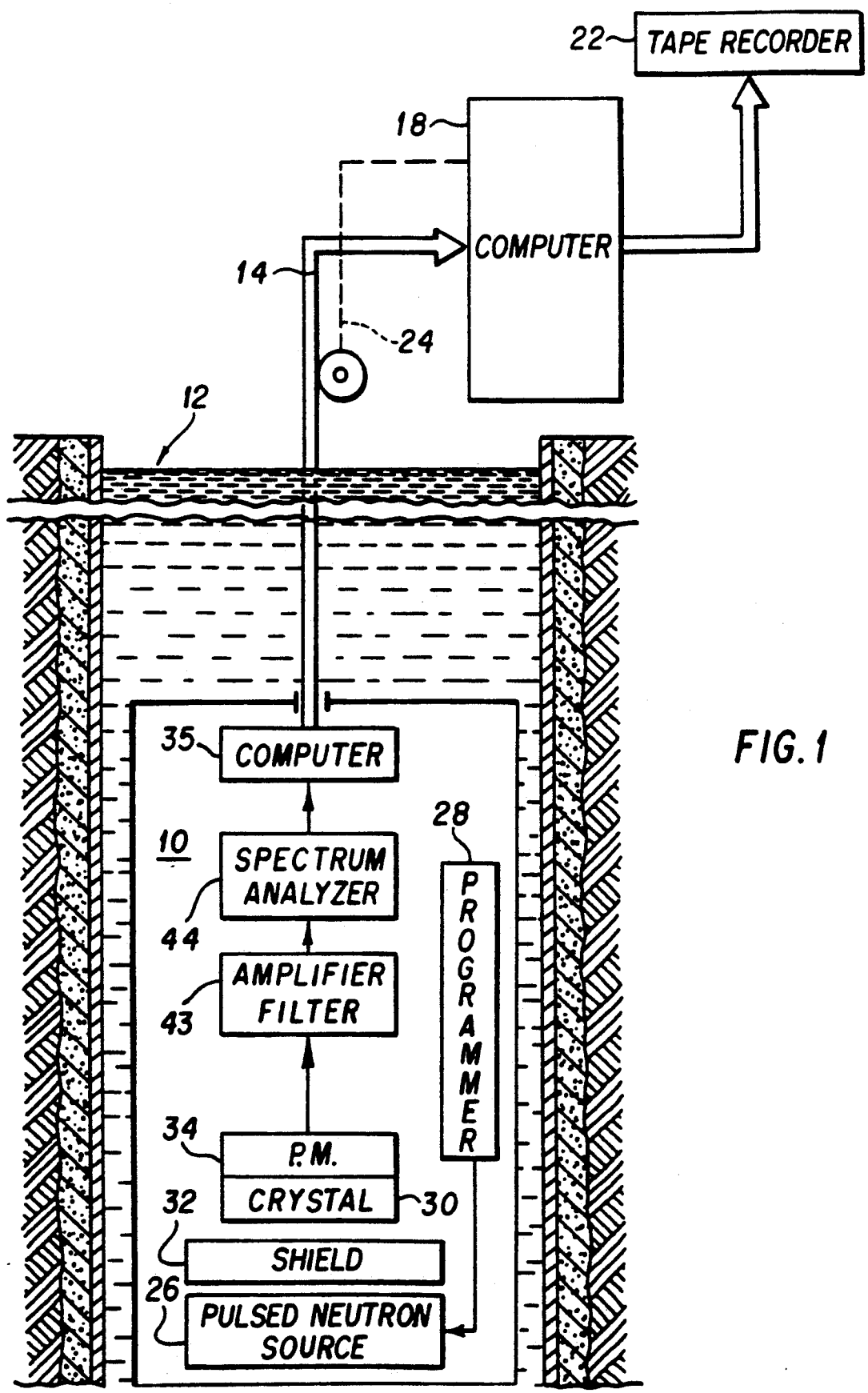
FIG. 1 is a block diagram of an example of application of the invention in the form of a logging tool.

FIG. 1 illustrates a spectroscopy logging tool 10 suspended in a borehole 12 by an armored cable 14. The tool 10 might be of the type described in U.S. Pat. No. 4,031,367, issued to Richard D. Murphy on Jun. 21, 1977. The cable 14 also provides connection between the tool 10 and the uphole electronics, which include a computer 18 and a magnetic tape recorder 22. Computer 18 suitably is a general purpose digital computer, such as that manufactured by Digital Equipment Corporation, Maynard, Mass., under the designation PDP-11. The computer 18 is coupled to the cable 14 by the usual mechanical linkage 24 for making the customary records of the logged values as a function of tool depth. Appropriate power supplies (not shown) are provided at the surface and in the well tool, for supplying power to the uphole and downhole electronics.

The tool 10 includes a pulsed neutron source 26 which, under the control of a programmer 28, emits successive pulses or bursts of high energy neutrons (14 Mev) into the formations surrounding the borehole 12. Gamma radiation resulting from interactions between the neutrons and formation nuclei, e.g. inelastic collision gamma rays, is detected by a scintillation crystal 30. A shield 32 is interposed between the crystal 30 and the neutron source 26. The crystal 30 is optically coupled to a photomultiplier tube 34 which, in response to a detected gamma ray, generates a pulse signal whose amplitude is representative of the energy of the gamma ray. Output pulses from the photomultiplier 34 are passed through amplifying-filtering circuits 43 and a spectrum analyzer 44, and then through a computer 35. The spectrum analyzer 44 incorporates a pulse height analyzer and a multichannel counting device for establishing the time spectra, both of which are not shown, but will be described further. At the surface, the data-bearing signals from the computer 35 are amplified, decoded and otherwise processed in the computer 18. Digital spectroscopy outputs are transmitted to the tape recorder 22. Emphasis is laid upon the fact the invention may alternatively be implemented in a natural gamma ray logging tool.

Figure 2:
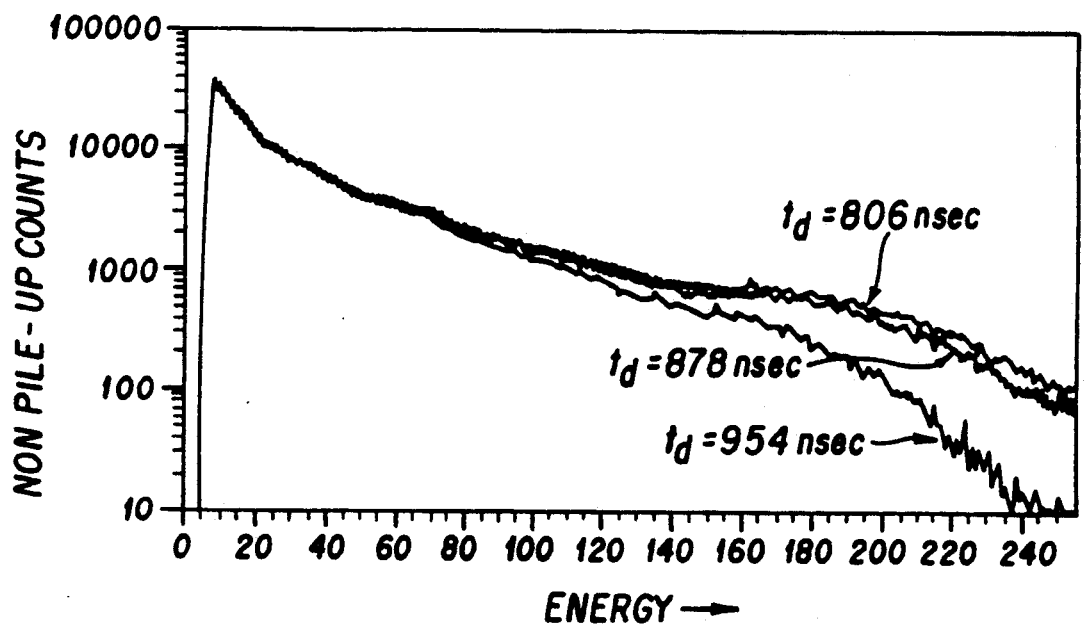
FIG. 2 shows a plot of the number of non pile-up counts versus the energy of the different events, for three different dead time values.

The influence of dead time variations on the energy spectrum of the gamma rays can be seen on FIG. 2, where the non pile-up event counts are plotted versus the energy of said events (gamma rays), for different dead time values "$t_d$" of respectively 806 ns, 878 ns, and 954 ns. It can be appreciated from these plots, the importance of knowing with accuracy the dead time value of the nuclear spectroscopy tool in use, and of regulating for the variations of said dead time.

The invention can be implemented in two ways, to wit either for dead time correction (for time spectra only), or for dead time regulation (in the time domain and in the energy domain).

According to a first aspect of the invention, the dead time correction mode includes successively the determination of the dead time and the correction of measured counts. The determination consists of a first step of establishing a reference plot of the pile-up count rates versus the non pile-up count rates, for different values of dead time, and of a second step for setting an actual plot of pile-up count rate versus non pile-up count rate, representative of the signal under analysis.

Figure 4:
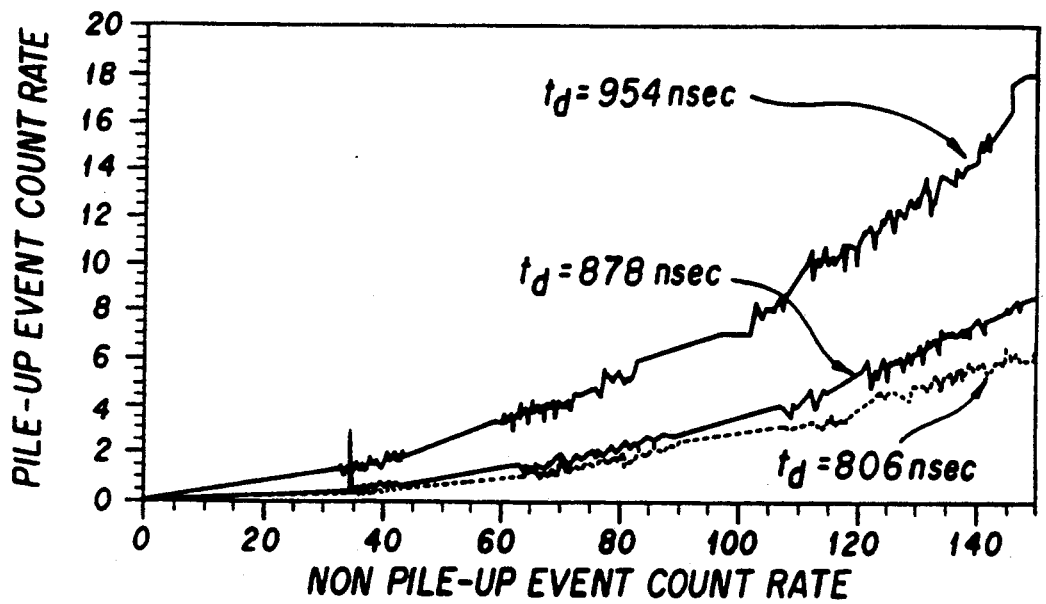
FIG. 4 shows an example of a reference plot, for three different dead time values, made through the apparatus shown on FIG. 3.

An example of a reference plot is shown on FIG. 4, where pile-up event count rates are plotted against non pile-up event count rates, for different dead time values, in this occurrence, three values. This is but one of various examples of reference plots which may be established according to the invention; other relationships between pile-up event count rates and non pile-up event count rates may be established.

Figure 3:
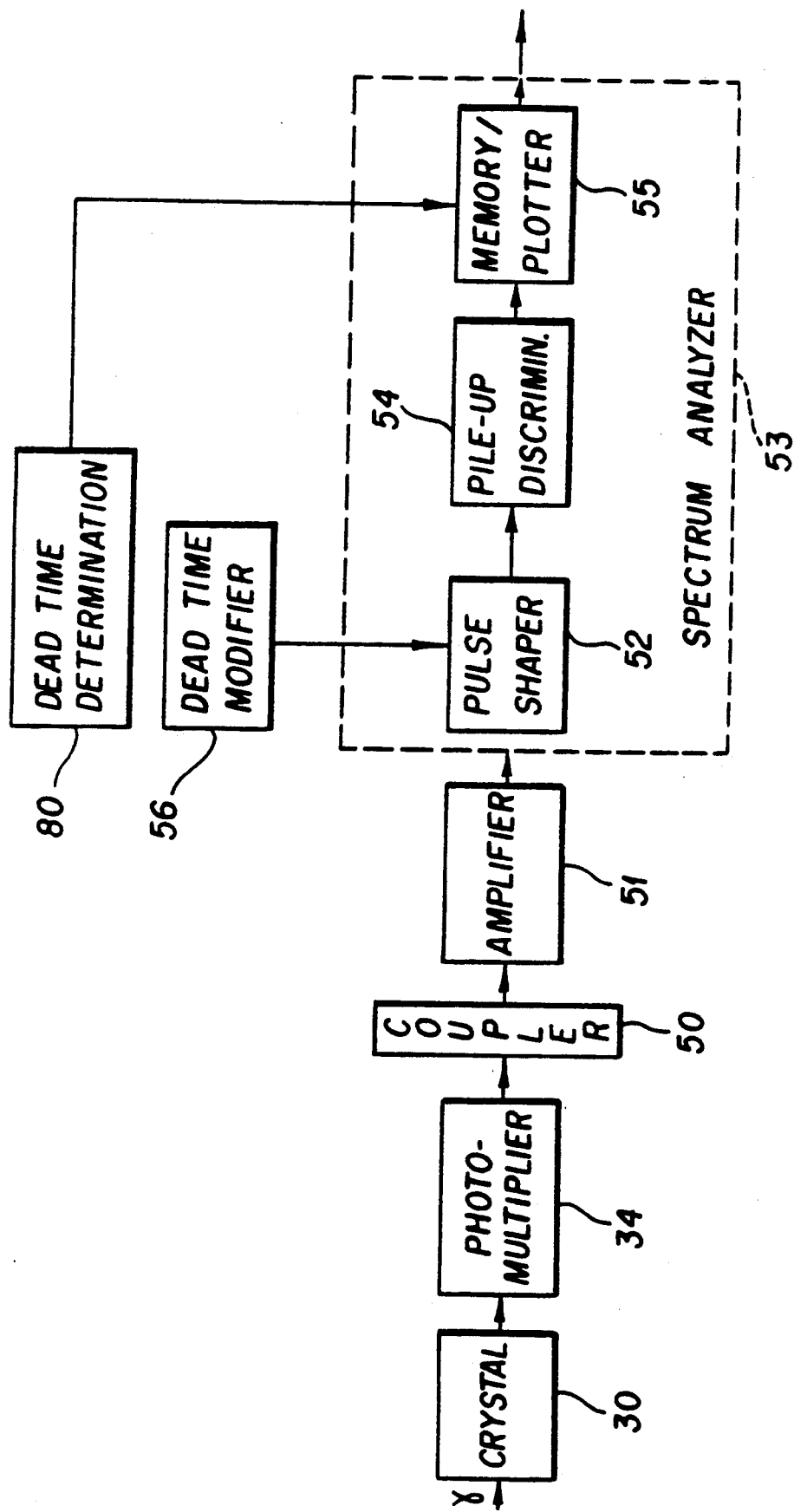
FIG. 3 is a chart of an apparatus according to the invention designed to establish a reference plot of the count rates of pile-up events, versus count rates of non pile-up events, for different dead time values.

FIG. 3 shows a schematic representation of the apparatus designed to make a reference plot, such as the one shown on FIG. 4. The apparatus includes successively, in the direction of data flow, a crystal detector 30, a photomultiplier 34, a coupler 50 (e.g. a capacitor), an amplifier 51, and a spectrum analyzer 53. The spectrum analyzer 53 comprises known components among which are only represented a pulse shaper 52 and a pile-up discriminator 54, and comprises also a memory/plotter 55. It is meant here by "memory/plotter" a device designed to count and record (or memorize) counts so as to establish the relationship between pile-up count rates and non pile-up count rates; a plot is an example of such relationship. A dead time determination circuit 80 is linked to the memory/plotter 55. A dead time modifier module 56 is connected to said pulse shaper 52. The reference plot is made, once and for all, for a given apparatus, and prior to the signal analysis itself. The reference plot may be used in connection with any further signal analysis. The determination of dead time, via circuit 80, is made prior to the signal analysis, according to any known method, such as one of those described in the book from Knoll already referred to. Modification of the dead time value, via dead time modifier 56, will be explained later.

Once a reference plot has been made, the actual plot (pile-up count rates versus non pile-up count rates) representative of the signal under analysis, may be determined. The actual plot is made, during the signal analysis, by counting for each time interval of one microsecond, and over repeated measurements time cycles, pile-up events and non pile-up events. These accumulated counts allow one to establish the corresponding count rates and thus to set the actual plot, showing the relationship between pile-up event count rate and non pile-up event count rate, for the actual dead time value. The actual dead time value is determined by comparison of the reference plots to the actual plot.

Figure 5:
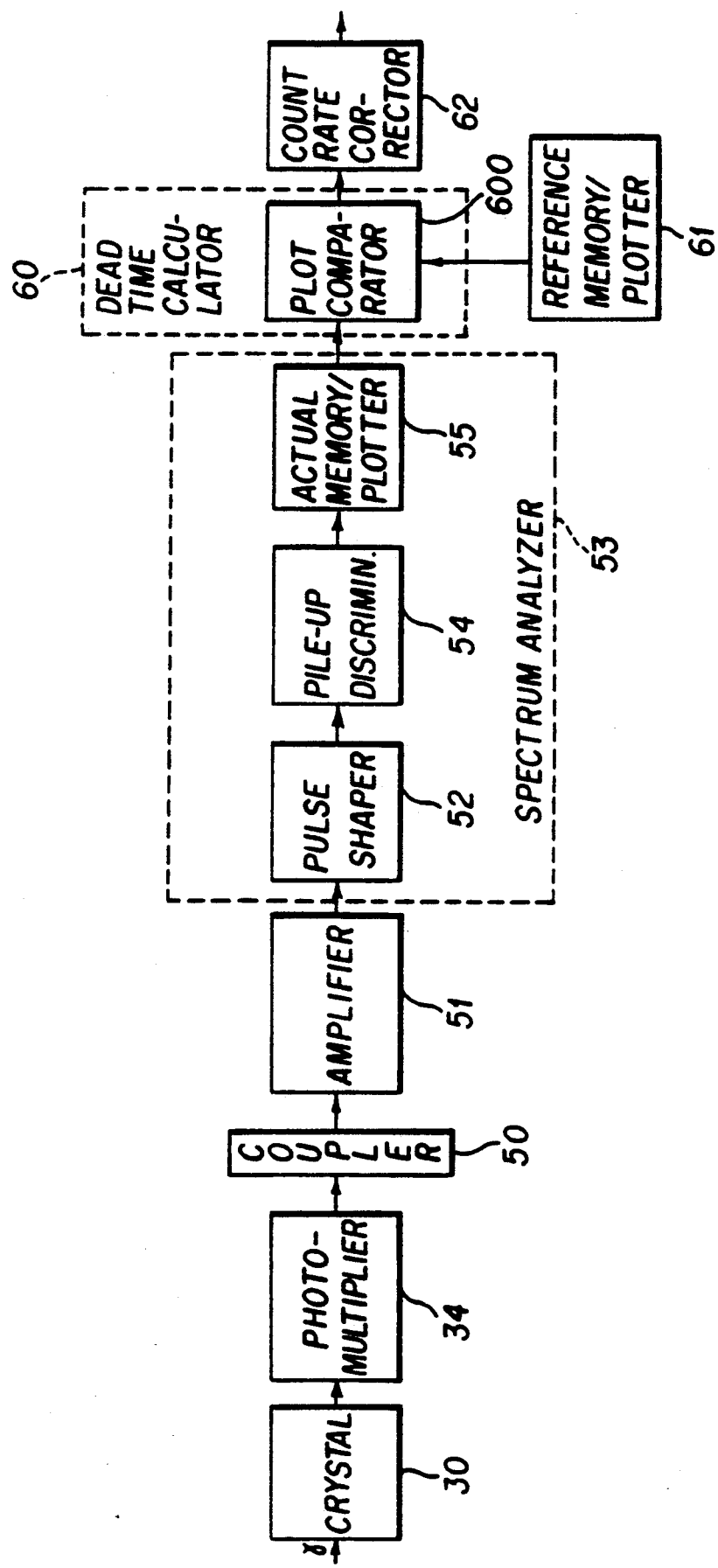
FIG. 5 is a chart of an apparatus of the invention for time spectrum correction purpose.

After the actual dead time has been determined, the dead time correction itself may be carried out, preferably during the signal analysis. To this end, there is provided an apparatus, an example of which is shown on FIG. 5, which includes a crystal 30, a photomultiplier 34, a coupler 50, an amplifier 51, a spectrum analyzer 53 and a dead time calculator 60. The dead time calculator 60 includes a plot comparator 600 which is also fed by a reference memory/plotter 61 in which is stored the reference plot. The dead time calculator 60 is followed by a count rate corrector 62 designed to apply to the actual count rates, a correction according to the following formula (given only by way of example):

$$\text{Corrected TCR} = \text{Actual TCR}/(1 - \text{Actual TCR} * t_d) \quad [1]$$

where "TCR" stands for Total Count Rate, i.e. the pile-up count rates plus the non pile-up count rates, and "$t_d$" stands for the actual dead time, as determined according to the aforementioned steps.

Figure 6:
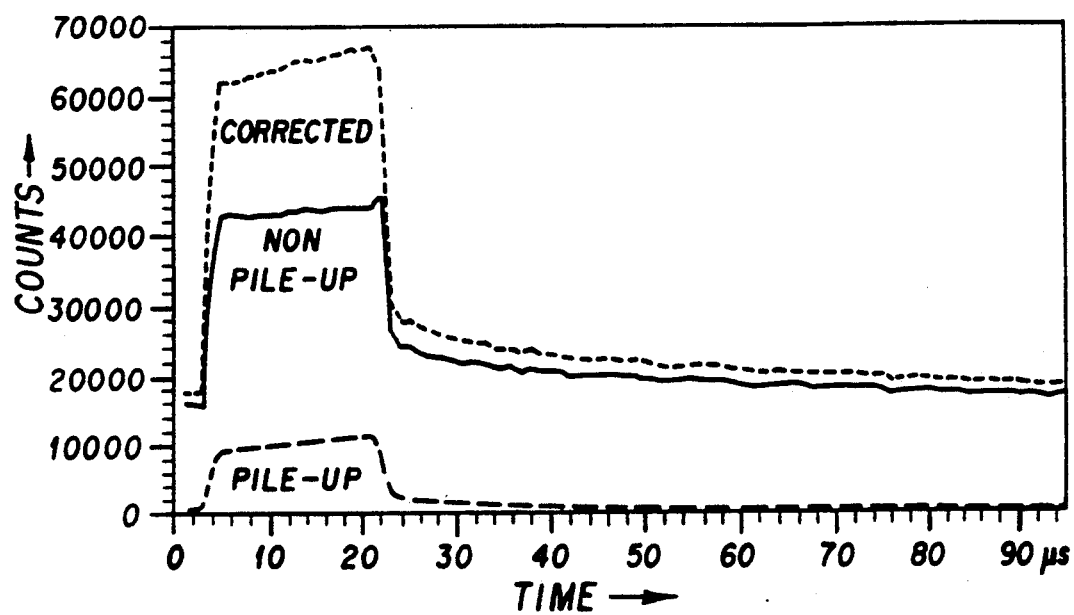
FIG. 6 shows three plots of, respectively, counts of the pile-up events, counts of non pile-up events, and corrected counts of events, versus time, over a measurement cycle.

FIG. 6 depicts three plots of counts as a function of time, during and following a neutron burst. It shows a dashed plot for pile-up counts, a continuous plot for non pile-up counts, and a dotted plot for corrected counts. Actually, each plot is made through individual counters, one for a given time window (e.g. one microsecond). In the example shown on FIG. 6, 90 time intervals are provided; the time period of 90 microsecond corresponds to a time cycle. Counts are repeated over several measurement time cycles, i.e. during e.g. one minute. These time figures are here given by way of example. The three plots comprise an enhanced and slightly tilted portion (located in this occurrence between time windows 5 and 23). The non pile-up plot (continuous plot) further shows, at the right end of said portion, a spike of additional count, caused by the reduction of the pile-up counts as the neutron burst turns off. The corrected count plot is obtained by applying e.g. the aforementioned formula [1]; the latter can be expressed as:

$$\text{Corrected TCR} = \text{non pile-up CR} + (K)\text{pile-up CR} \quad [2]$$

where CR stands for Count Rates, and K being a correction factor which is a function of dead time, non pile-up count rate, and pile-up count rate.

The invention allows for the determination of the respective accumulated counts for each time window. This is of importance, since the variations of the count rate are thus taken into account during each measurement time cycle, from one time window to another. This results in an accurate value of the dead time.

Apart from the dead time correction above described, the invention allows one, according to a second aspect, to regulate the dead time. In other words, the apparatus is designed to maintain, during the signal analysis, the dead time value to an imposed constant value. According to an interesting feature of the invention, the regulation is made "indirectly", through determination and modification of a functioning parameter of the signal analysis, so as to bring the actual dead time value (actually undetermined) to the imposed constant value chosen by the operator. The calculation of the actual dead time value is not required. Prior to any signal analysis, the relationship between said functioning parameter and the dead time is preliminarily established, once and for all.

Figure 7:
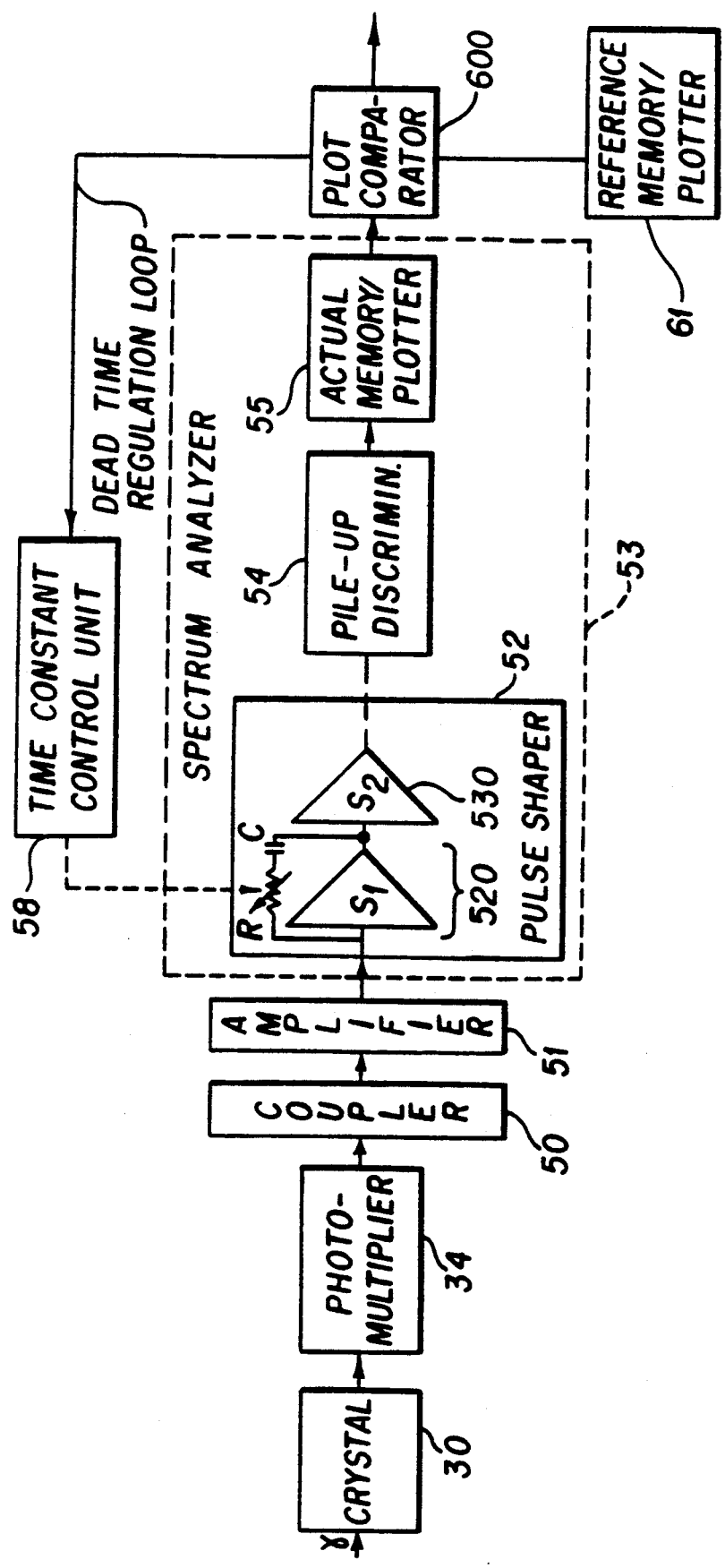
FIG. 7 is a chart of an apparatus for dead time regulation purpose.

On FIG. 7 is shown a schematic representation of an example of the apparatus of the invention, designed to perform the dead time regulation, in the time domain as well as in the energy domain. It includes successively, in the direction of data flow, a crystal detector 30, a photomultiplier 34, a coupler 50, an amplifier 51, a spectrum analyzer 53, and a plot comparator 600. The spectrum analyzer 53 includes a pulse shaper 52, a pile-up discriminator 54 and an actual memory/plotter 55. Pulse shaper 52 (known in the art) comprises a differentiation filter 520, followed by one or more integration filters 530 (comprised each mainly of an amplifier S2) The differentiation filter 520 comprises an amplifier S1 in parallel with a variable resistor R in series with a capacitor C. Plot comparator 600 has one of its outputs connected to a time constant control unit 58 which is designed to actuate the variable resistor R. The connection between plot comparator 600 and the resistor R, via time constant control unit 58, is called the dead time regulation loop. Plot comparator 600 is also fed with a reference memory/plotter 61 in which is stored the reference plot (generated by the apparatus of FIG. 3).

Regulation of the dead time value is carried out, during signal analysis, by comparing the actual plot to the reference plot. In case of a difference between these respective plots, the plot comparator 600 actuates time constant control unit 58, which in turn modifies the resistor R value of the differentiation filter 520 to a new value corresponding to said imposed dead time value, according to the preliminary determined relationship between the resistance R and the dead time. Particular attention should be given to the fact that the dead time does not need to be calculated; the regulation is carried out through successive modifications of a functioning parameter (in this case the value R) which is related to the dead time value.

This is but one of many ways of regulating the dead time value. This can be achieved by modifying, alternately, e.g. either the capacitor C value, or an electrical characteristic of the coupler 50.

Reference is now made back to FIG. 3, showing an apparatus designed to generate a reference plot. In order to make the reference plot, the dead time is modified (through the dead time modifier 56), according to another feature of the invention, by modification of a functioning parameter of the apparatus, such as, e.g., the resistor R of the differentiation filter 520, as already described in connection with FIG. 7. In other words, dead time modifier 56 of FIG. 3 has the same function as the time constant control unit 58 of FIG. 7.

Furthermore, the spectrum analyzer 53 may be of the wellknown type, or such as the one described in the U.S. patent application, filed on Apr. 28, 1989 under Ser. No. 344,729, now U.S. Pat. No. 5,067,090, in the name of B. Seeman, and assigned to the assignee of the present application.

Although the invention has been described and illustrated with reference to a specific embodiment thereof, it will be understood by those skilled in the art that various modifications and variations of that embodiment may be made without departing from the invention concepts disclosed. Accordingly, all such modifications are intended to be included within the spirit and scope of the appended claims.

What is claimed is:

1. A nuclear spectroscopy method for the analysis of an electric signal emitted by a radiation detector and including random nuclear events, represented by pulses, whose amplitude is a measure representative of the nuclear radiation collected by said radiation detector, and for determining the minimum time interval, or dead time, which must separate two successive events so that said successive events can be recorded as distinct events, comprising the steps of:
   (a) prior to the analysis of said electric signal, counting and recording, for different predetermined values of the dead time, the pile-up count rates, i.e. events identified as being characteristic of two or more overlapping events, and the non pile-up count rates;
   (b) combining said pile-up count rates and said non pile-up count rates according to a predetermined relationship so as to form a reference relation;
   (c) counting and recording the pile-up count rates and the non pile-up count rates of the signal to be analyzed;
   (d) combining said pile-up count rates and non pile-up count rates of the signal to be analyzed according to said predetermined relationship, so as to form an actual relation; and
   (e) comparing said actual relation to said reference relation, and thus determining the actual dead time value.

2. The method according to claim 1, wherein, for forming said reference relation, the different values of the dead time are obtained through modification of a functioning parameter linked to and characteristic of the analysis of said signal.

3. The method according to claim 2 further comprising a pulse shaping step, wherein said functioning parameter is a time constant characteristic of said pulse shaping step.

4. The method according to claim 1, wherein said predetermined relationship comprises a plot of the pile-up count rates versus the non pile-up count rates, for said different predetermined values of the dead time.

5. The method according to claim 1, further including the step of calculating the corrected total count rates, as a function of said pile-up count rates and said non pile-up count rates of the signal to be analyzed and said actual dead time value, according to a predetermined mathematical formula giving said corrected total count rates as the sum of said non pile-up count rates, plus the product of said pile-up count rates by a correcting factor which is a function of said actual dead time value, of said non pile-up count rates, and/or of said pile-up count rates of the signal to be analyzed.

6. The method according to claim 5 wherein said pile-up count rates and said non pile-up count rates of the signal to be analyzed are counted and recorded in successive time windows, and said calculating is carried out for each time window where count rates are detected and counted.

7. The method according to claim 1 wherein said nuclear radiation comprises gamma rays, coming from earth formations surrounding a borehole and resulting either from natural radioactivity, or from interactions between formation nuclei and high energy neutrons irradiating said formations.

8. A nuclear spectroscopy apparatus for the analysis of an electric signal emitted by a radiation detector and including random nuclear events, represented by pulses, whose amplitude is a measure representative of the nuclear radiation collected by said radiation detector, for determining the minimum time interval, or dead time, which must separate two successive events so that said successive events can be recorded as distinct events, comprising:
   (a) first means for, prior to the analysis of said signal, counting and recording, for different predetermined values of the dead time, the pile-up count rates, i.e. events identified as being characteristic of two or more overlapping events, and the non pile-up count rates;
   (b) means for combining said pile-up count rates and said non pile-up count rates according to a predetermined relationship, so as to form a reference relation;
   (c) second means for counting and recording the pile-up count rates and the non pile-up count rates of the signal to be analyzed;
   (d) means for combining said pile-up count rates and said non pile-up count rates of the signal to be analyzed according to said predetermined relationship so as to form an actual relation; and
   (e) means for comparing said actual relation to said reference relation, and thereby determining the actual dead time value.

9. The apparatus according to claim 8 wherein said first means for counting and recording includes means for modifying the dead time to different values by modifying a functioning parameter characteristic of the signal analysis.

10. The apparatus according to claim 9 wherein said functioning parameter is a time constant, and said time constant is characteristic of an electrical signal coupler provided at the output of said detector.

11. The apparatus according to claim 8 wherein said predetermined relationship is a plot of the pile-up count rates versus the non pile-up count rates, for different dead time values.

12. The apparatus according to claim 8 wherein said nuclear radiation comprises gamma rays coming from earth formations surrounding a borehole and resulting either from natural radioactivity, or from interactions between formation nuclei and high energy neutrons irradiating said formations.

13. A nuclear spectroscopy apparatus for the analysis of an electrical signal emitted by a radiation detector and including random nuclear events, represented by pulses whose amplitude is a measure representative of the nuclear radiation collected by said radiation detector, comprising:

(a) means for establishing, prior to the signal analysis, the relationship between different plots of pile-up count rates versus non pile-up count rates and a functioning parameter characteristic of the signal analysis apparatus;

(b) means for establishing a reference plot corresponding to an imposed constant dead time value;

(c) means for establishing an actual plot of said pile-up count rates versus said non pile-up count rates of the signal to be analyzed;

(d) means for comparing said actual plot and said reference plot; and (e) means for modifying, in case of a difference between said respective actual and reference plots, the functioning parameter so as to bring said actual plot in accordance with said reference plot.

14. The apparatus according to claim 13 wherein said functioning parameter is a time constant characteristic of at least a part of the signal analysis apparatus.

15. The apparatus according to claim 13 wherein said nuclear radiation comprises gamma rays coming from earth formations surrounding a borehole and resulting either from natural radioactivity or from interactions between formation nuclei and high energy neutrons irradiating said formations.

16. A nuclear spectroscopy logging apparatus for determining characteristics of earth formations, including:

(a) means for detecting nuclear particles coming from the formations, and resulting either from natural radioactivity, or from interactions between formation nuclei and high energy neutrons irradiating said formations, said detecting means emitting an electric signal including random nuclear events, represented by pulses, whose amplitude is a measure representative of said particles;

(b) means for determining the minimum time interval, or dead time, which must separate two successive events so that said events can be recorded as distinct events; and (c) means for counting and recording, versus time, the accumulated counts of the pile-up events, i.e. events identified as being characteristic of two or more overlapping events, and the counts of non pile-up events, for each of the successive time windows of a measurement time cycle.

17. The apparatus according to claim 16 wherein said means for counting and recording are designed to perform over several time cycles.

18. A nuclear spectroscopy method for the analysis of an electrical signal emitted by a radiation detector and including random nuclear events, represented by pulses whose amplitude is a measure representative of the nuclear radiation collected by said radiation detector, comprising the steps of:

(a) establishing, prior to the analysis of said electric signal, a reference value of the minimum time interval, or dead time, which must separate two successive events so that said successive events can be recorded as distinct events;

(b) determining, prior to the analysis of said signal, a reference plot corresponding to said reference dead time value;

(c) determining, prior to the analysis of said signal, a functioning parameter linked to and characteristic of the analysis of said signal;

(d) establishing, during the analysis of said signal, an actual plot of pile-up count rates versus non pile-up count rates of the signal to be analyzed;

(e) comparing said actual plot and said reference plot; and (f) modifying, in the case of a difference between said actual and reference plots, said functioning parameter so as to match said actual plot with said reference plot.

19. The method according to claim 18 further comprising a pulse shaping step, wherein said functioning parameter is a time constant characteristics of said pulse shaping step.

20. The method according to claim 19 wherein said time constant is characterized by a resistive or capacitive element of a differentiation filter of said pulse shaping step.

21. The method according to claim 18 wherein said nuclear radiation comprises gamma rays coming from earth formations surrounding a borehole and resulting either from natural radioactivity, or from interactions between formation nuclei and high energy neutrons irradiating said formation.

* * * * *